April 9, 1968  R. C. MEYERS  3,377,530
HIGH POTENTIAL CAPACITOR
Filed May 24, 1966 2 Sheets-Sheet 1
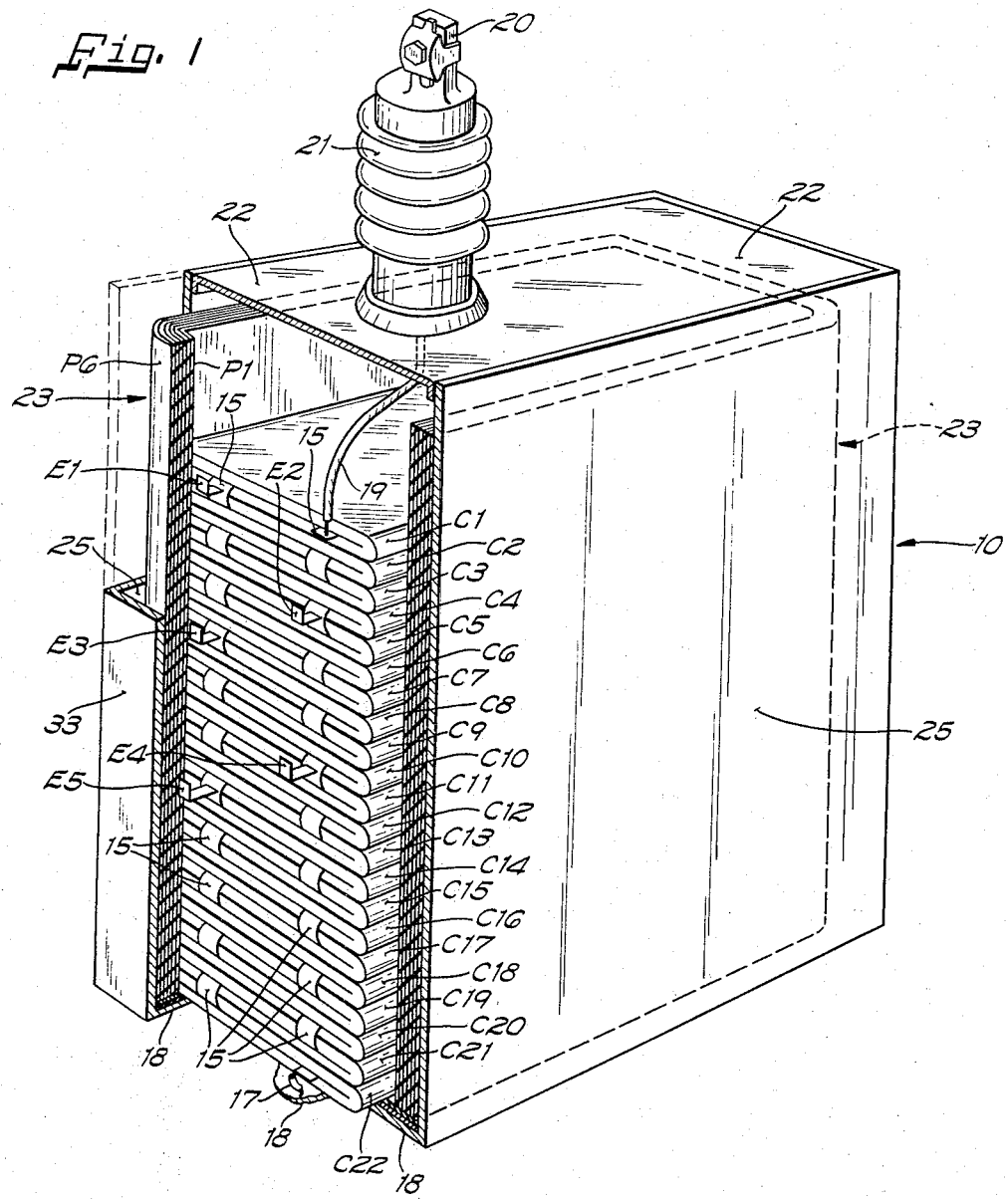
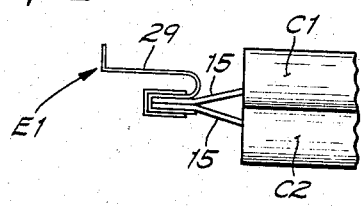
INVENTOR.
Ralph C. Meyers
BY Charlotte Cundell
Attorney April 9, 1968  R. C. MEYERS  3,377,530
HIGH POTENTIAL CAPACITOR
Filed May 24, 1966  2 Sheets-Sheet 2
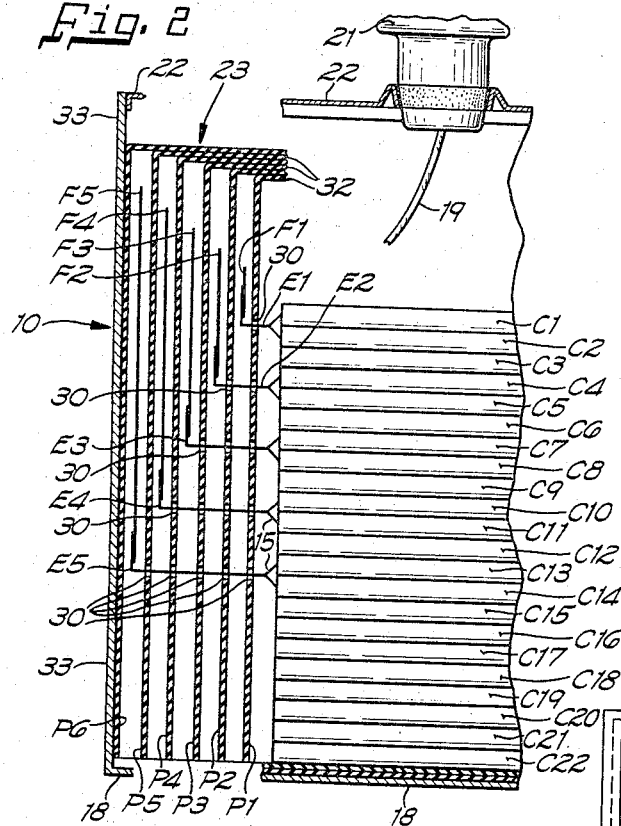
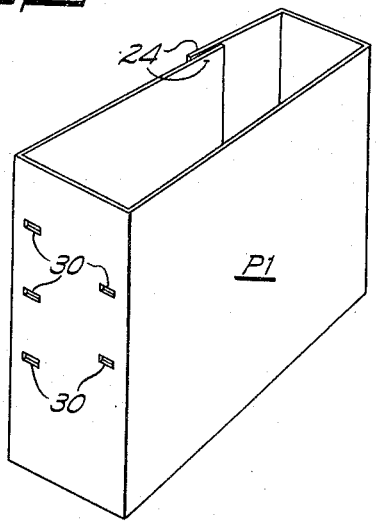
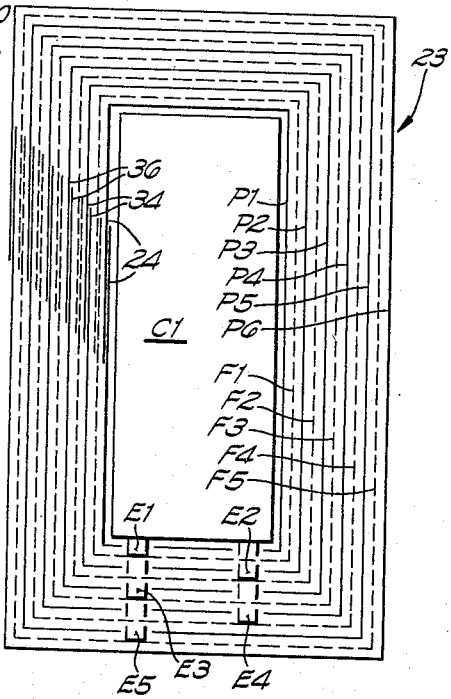
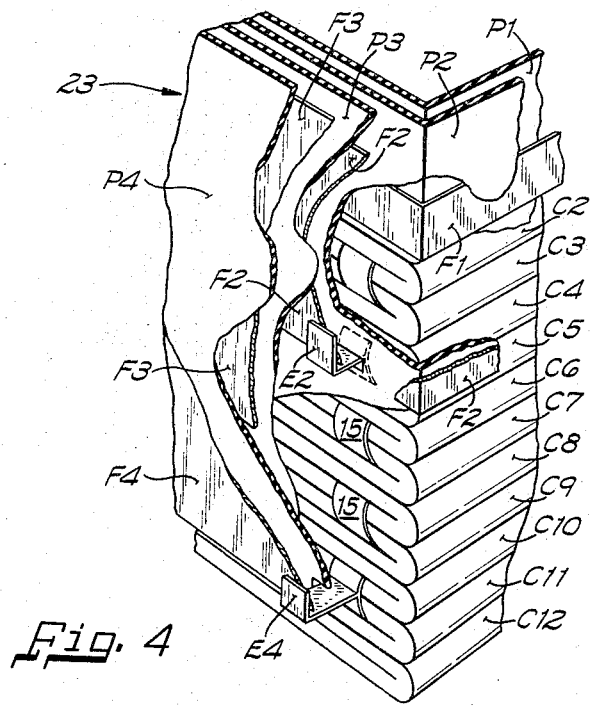
INVENTOR.
Ralph C. Meyers
BY
Attorney United States Patent Office 3,377,530
Patented Apr. 9, 1968

3,377,530
HIGH POTENTIAL CAPACITOR
Ralph C. Meyers, New Berlin, Wis., assignor to McGraw-Edison Company, Milwaukee, Wis., a corporation of Delaware
Filed May 24, 1966, Ser. No. 552,451
7 Claims. (Cl. 317—242)

ABSTRACT OF THE DISCLOSURE

A high voltage capacitor having a metallic casing and a plurality of series connected capacitor packs, one end of which is connected to the casing and the other end to a high voltage bushing. An insulating envelope surrounding the capacitor packs and including a plurality of interleaved layers of insulation and conductive stress grading layers wherein the stress grading layers increase in area and are connected to capacitor packs of decreasing potential as they progress radially outwardly to uniformly stress the layers of insulating material.

Background of the invention

This invention relates to high potential capacitors such as energy storage and power factor correction capacitors.

High potential capacitor packs, or sections, are conventionally constructed from a pair of metallic foils separated by insulating material such as several layers of kraft paper and wound on a mandrel and flattened. The flattened packs are assembled into a metallic casing, and tinned copper or aluminum terminals, termed tabs, engaging the foils in each pack are soldered or spot welded together to connect the packs in desired series-parallel arrangements to obtain rated voltage and kilovar for the capacitor. A wrapping of paper or paperboard, termed the major insulation, is placed around the assembled packs to insulate them from the metallic casing. The terminals of the end packs may then be connected by suitable connectors to the conductive studs of insulating bushings on the cover of the capacitor casing, or on one-bushing units the termination of one end pack may be made to the metallic tank. Although such conventional structure is satisfactory for capacitors rated from 2,400 to 14,400 volts, such construction does not provide a basic impulse level above 95 kilovolts. For example, in order to obtain a sufficiently high basic impulse level for power factor correcting capacitors, it has heretofore been necessary on power systems above 14,400 volts to use a plurality of such capacitors in series, i.e., to use more than a single series group, and this adds appreciably to the cost and complexity of fusing a capacitor bank.

It is an object of this invention to provide a high potential capacitor which will make more economic use of insulation, in terms of size, and provide more reliable electrical insulation of active material (capacitor) from the container when said active (capacitor) material is subjected to normal voltages (DC or cyclical) or transient or continuous overvoltages (DC, cyclical or oscillatory). It is a further object to provide an improved power factor correction capacitor for use on power systems above 14.4 kilovolt rating. Another object is to provide such a power factor correction capacitor which requires only a single series group on 20/34.5 kilovolt power systems, thereby simplifying the fusing of a capacitor bank.

Brief description of the drawings

FIG. 1 is a perspective view of a high potential capacitor embodying the invention with one end wall broken away to illustrate the internal construction;

FIG. 2 is an exploded sectional view through the major insulation of the capacitor of FIG. 1 with the insulation and foil sheets shown spaced apart to better illustrate the construction;

FIG. 3 is a perspective view of one sheet of the major insulation of the capacitor shown in FIG. 1;

FIG. 4 is a perspective view of the capacitor packs surrounded by the major insulation with sections through the insulation and foil sheets progressively stepped back to illustrate the internal construction;

FIG. 5 is a schematic plan view of the major insulation with the foil sheets shown in dotted lines and the insulation sheets shown in full lines; and FIG. 6 is a detail view illustrating the additional electrodes joined to the commoned capacitor tabs of adjacent capacitor packs.

Description of the preferred embodiment

Referring to the drawing, a high potential capacitor embodying the invention has a metallic tank 10 filled with a suitable dielectric insulating fluid such as chlorinated diphenyl and enclosing a plurality of flattened capacitor packs, or sections, C1–C22. Each section, or pack, C1–C22 may have superimposed metallic foils (not shown) separated by several layers of thin kraft paper (not shown) and spirally wound in conventional manner into a cylinder and flattened. A pair of thin, tinner copper or aluminum terminals, or tabs 15 are inserted in each pack C1–C22 during the winding thereof in engagement with the foils and are disposed near opposite ends of the pack when it is flattened.

The flattened packs C1–C22 are assembled in superimposed relation within casing 10 so that the packs are in horizontal planes, and the terminals 15 of adjacent packs C1–C22 may be connected together by suitable means such as soldering to connect all of packs C1–C22 in series or series parallel. One terminal 15 of the bottom pack C22 may be electrically connected by a conductor 17 to the bottom wall 18 of the casing, and one terminal 15 of the top pack C1 may be connected by a conductor 19 to the conductive stud 20 of an insulating bushing 21 mounted on the cover 22 of metallic casing 10.

The assembled packs C1–C22 are insulated from casing 10 by the major insulation envelope 23 which comprises a plurality of layers of paper disposed in vertical planes and folded to surround the assembled packs C1–C22 and prevent pack-to-tank failures. The major insulation envelope 23 may comprise six layers P1, P2, P3, P4, P5 and P6 of pure kraft paper 0.010 inch in thickness having a vertical dimension greater than that of the packs and wrapped around the assembled packs C1–C22 so that the respective ends of each of the six layers P1–P6 appreciably overlap along one longer sidewall 25 of the casing 10 and no point in the major insulation envelope 23 is thinner than six layers of kraft paper. Such major insulation envelope is satisfactory for power factor correction capacitors rated from 2,400 to 14,400 volts, but it does not provide a basic impulse level above 95 kilovolts and necessitates the use of a plurality of power factor correction capacitors in series for use on power systems above 14,400 volts.

In accordance with the invention the major insulation envelope 23 of a high potential capacitor is graded by metallic foil electrodes F1, F2, F3, F4 and F5 interleaved with the layers P1, P2, P3, P4, P5 and P6 of kraft paper of the major insulation envelope 23 to attain uniform voltage stress and thus prevent puncture of the major insulation of breakdown along the surface of the insulation. The major insulation envelope 23 is preferably graded between the metallic tank 10 and those packs which are subjected to the highest potential relative to ground, i.e., pack C1 which is connected to the capacitor bushing stud 20 by conductor 19 and those packs adjacent pack C1.

Assuming that a high potential capacitor of the power factor correcting type is connected to a 20/34.5 kilovolt power system, the 20,000 volt r.m.s. potential will divide across the series connected packs C1–C22 which forms a voltage divider, and the potential across each pack will be approximately 909 volts. The voltage between upper pack C1 and grounded tank 10 is approximately 20,000 volts; the voltage between pack C2 and tank 10 is approximately 19,091 volts; the voltage between pack C3 and tank 10 is approximately 18,182 volts; and the voltage between the tank 10 and the successive packs in a direction toward bottom pack C22 progressively decreases.

Additional electrodes E1, E2, E3, E4 and E5 are connected, preferably by spotwelding, to the commoned terminals 15 which respectively connect the upper and second packs C1 and C2 of the stacked packs; the fourth and fifth packs C4 and C5; the seventh and eighth packs C7 and C8; the tenth and eleventh packs C10 and C11; and the thirteenth and fourteenth packs C13 and C14. The additional electrodes E1, E2, E3, E4, and E5 are electrically connected to the foils F1, F2, F3, F4 and F5 respectively. Each additional electrode E1–E5 comprise a generally L-shaped tinned copper terminal 29 spotwelded to the electrically commoned tabs 15 as shown in FIG. 6.

Radially inner kraft paper layer P1 of the major insulation envelope 23 is disposed in vertical planes and is wrapped completely around assembled packs C1–C22 so that the ends 24 thereof overlap along longer side 25 of metallic casing 10. As best seen in FIG. 3, radially inner kraft paper layer P1 has five spaced apart apertures 30 therein which receive the electrodes E1–E5. Paper layer P1 extends from adjacent the bottom wall 18 of casing 10 to adjacent the casing cover 22 and may have a folded over portion 32 adjacent its upper end (shown only in FIG. 2) extending inwardly from casing end wall 33. Radially inner foil F1 may comprise a thin foil of suitable conductive material such as aluminum and preferably is wrapped completely around the assembled packs C1–C22 and overlies paper layer P1 and has its ends 24 overlapping along longer side 25 of casing 10. Foil F1 may have a relatively small vertical dimension, for example, equal to the thickness of approximately three packs and be disposed approximately at the height of the packs C1 and C2 and have electrode E1 soldered thereto.

Second kraft paper layer P2 is similar to radially inner paper layer P1 except that it only has four apertures 30 therein for the electrodes E2–E5 and is wrapped completely around the packs C1–C22 and is disposed in vertical planes and overlays foil F1 and extends from adjacent the casing bottom wall 18 to adjacent casing cover 22 where it may terminate its upper end in a folded over portion 32 disposed in a horizontal plane. The ends 34 of paper layer P2 also overlap along casing sidewall 25 in circumferentially spaced relation from the overlapped ends 34 of radially inner paper layer P1. Second foil F2 is similar to inner foil F1 but has a vertical dimension approximately equal to the thickness of six packs and overlay paper layer P2 and is connected by solder to electrode E2 and is disposed opposite packs C1–C4 and extends vertically above and below pack C1 and completely surrounds the packs.

Third kraft paper layer P3 is similar to paper layers P1 and P2 except that it has only three apertures 30 therein for the electrodes E3–E5 and is wrapped completely around the packs C1–C22 so that it overlays foil F2 and is disposed in vertical planes and extends from adjacent the casing bottom wall 18 to adjacent casing cover 22 and may terminate at its upper end in a portion 32 folded over in a horizontal direction, and the ends 36 of paper layer P3 may overlap along casing sidewall 25 but in circumferentially spaced relation to overlapped ends 34 of paper layer P2. Third foil F3 is similar to foils F1 and F2 but has a vertical dimension approximately equal to the thickness of ten packs and overlays paper layer P3 and is connected by solder to the electrode E3 and is disposed opposite packs C1–C7 and extends above upper pack C1 and above and below foil F2 and is wrapped completely around packs C1–C22 and has its ends overlapped along casing sidewall 25. Fourth kraft paper layer P4 is similar to layers P1–P3 but has only two apertures 30 therein for the electrodes E4 and E5 and also is wrapped completely around the packs C1–C22 and has its ends overlapping along longer casing sidewall 25 in circumferentially spaced relation to the overlapped ends of the paper layers P1–P3. Fourth foil F4 is similar to foils F1–F3 but has a vertical dimension approximately equal to the thickness of fourteen packs and overlays paper layer P4 and is connected by solder to electrode E4 and is disposed opposite packs C1–C10 and extends above and below foil F3 and is completely wrapped around the capacitor packs. Fifth kraft paper layer P5 is similar to layers P1–P4 but only has one aperture 30 therein for electrode E5 and also is wrapped completely around the packs C1–C22 and overlays fourth foil F4 and has its ends overlapping along casing sidewall 25 in circumferentially spaced relation to the overlapped ends of paper layers P1–P4. Fifth foil F5 is similar to foils F1–F4 but has a vertical dimension approximately equal to the thickness of eighteen packs and overlays paper layer P5 and is connected by solder to electrode E5 and is disposed opposite packs C1–C13 and extends above and below foil F4 and is completely wrapped around the capacitor packs. Sixth paper layer P6 is similar to paper layers P1–P5 and overlays foil F5 and is disposed against the internal surface of the sidewalls and the endwalls of casing 10.

The area of the foil electrodes in each pack C1–C22 is considerably greater than that of foil electrodes F1, F2, F3, F4 and F5 of the graded major insulation envelope 23, and the connection of foil electrodes F1–F5 of the graded insulation to the electrodes E1–E5 which, in turn, are connected to electrically commoned terminals of adjacent packs control the potential of the foil electrodes F1, F2, F3, F4 and F5 of the major insulation, thereby assuring uniform stress of the insulation layers P1–P6 and preventing puncture and tracking of the major insulation 23 even when the capacitor is of the power factor correction type and is connected to a power system having a potential above 14.4 kilovolts. The packs C1–C22 comprise a capacitance voltage divider between the capacitor bushing stud 20 and the tank 10 and maintain the foil electrodes F1–F5 of the major insulation envelope 23 at predetermined potentials so that the voltage stress across the paper layers P1, P2, P3, P4 and P5 and P6 of the major insulation envelope 23 is uniform and pack-to-tank puncture is prevented.

Although the invention has been illustrated and described as having graded major insulation between the packs and the tank end walls and sidewalls, it will be appreciated that the kraft paper layers and foil electrodes of the major insulation envelope may be folded over and disposed between the packs and the tank bottom wall. In alternative embodiments the major insulation envelope may be divided into a left hand group of U-shaped layers of kraft paper and a right hand group of U-shaped layers of kraft paper which are interleaved with foil electrodes and embrace the packs with the open ends of the U-shaped groups facing other and overlapping so as to assure a complete blanket of insulation around the assembled packs.

While only a single embodiment of the invention has been illustrated and described, many modifications and variations thereof will be readily apparent to those skilled in the art, and consequently it is intended in the appended claims to cover all such modifications and variations which are within the true spirit and intent of the invention.

I claim:

1. A high potential capacitor comprising, in combination, a metallic casing, an insulating bushing on said casing having conductive means extending axially therethrough, a plurality of flattened capacitor packs assembled within said casing each having superimposed thin conductive electrodes with insulation therebetween, certain of said packs being connected in series and one end pack of said series connected packs being connected to a wall of said metallic casing and the other end pack being connected to said conductive means extending through said insulating bushing, a major insulation envelope comprising a plurality of layers of insulating material surrounding said packs and isolating them from walls of said casing, and a plurality of thin conductive stress grading electrodes interleaved with said layers of insulating material and embracing certain of said assembled packs adjacent said other end pack, said stress grading electrodes being smaller in area than said electrodes of said packs and being individually connected to the junctions between certain of said series connected packs, the radially innermost stress grading electrode being connected to the junction of a pair of said packs adjacent said other end pack and successive stress grading electrodes in a radially outer direction being connected to junctions of said series connected packs progressively displaced away from said other end pack and toward said one end pack, whereby said series connected packs constitute a voltage divider when said capacitor is energized and maintains said stress grading electrodes at predetermined potentials and assure uniform stress of said layers of insulating material.

2. A capacitor in accordance with claim 1 wherein said casing is rectangular in horizontal section and said flattened packs are disposed in horizontal planes and superimposed in a stack.

3. A capacitor in accordance with claim 1 wherein said stress grading electrodes in a radially outer direction progressively increases in area and aid in controlling the voltage gradient between said packs and said casing.

4. A capacitor in accordance with claim 2 wherein said stress grading electrodes and said layers of insulating material are disposed in vertical planes between said packs and the end walls and sidewalls of said casing and surround said packs and said stress grading electrodes progressively increase in area in a radially outer direction.

5. A capacitor in accordance with claim 1 wherein said layers of insulating material are of kraft paper and the ends thereof are in overlapping relation.

6. A capacitor in accordance with claim 1 wherein said conductive electrodes of said packs and said stress grading electrodes are metallic foils and said insulation of said packs and said insulating material of said major insulation envelope is of kraft paper.

7. A capacitor in accordance with claim 1 wherein said radially innermost stress grading electrode is connected to the junction of said other end pack with the adjacent pack and the stress grading electrodes in a radially outer direction increase progressively in area and are connected to junctions of said series connected packs displaced progressively toward said one end pack.

References Cited
UNITED STATES PATENTS 2,231,701    2/1941    Brooks      317—242
3,024,393    3/1962    Ferrante      317—242

DARRELL L. CLAY, *Primary Examiner.*

L. H. MYERS, *Examiner.*

E. GOLDBERG, *Assistant Examiner.*